May 12, 1942.　　　L. H. WINTERS　　　2,282,444

PIE PAN LID

Filed March 31, 1941

Lincoln H. Winters
INVENTOR

BY Victor J. Evans & Co.
ATTORNEYS

Patented May 12, 1942

2,282,444

UNITED STATES PATENT OFFICE 2,282,444

PIE PAN LID

Lincoln H. Winters, Grant County, N. Dak.

Application March 31, 1941, Serial No. 386,181

3 Claims. (Cl. 53—6)

This invention relates to pie pan lids and has for an object to provide a lid which may be easily attached to and removed from the pie pan and which when applied to the pie pan will press the two layers of pie crust firmly together and seal them against any leakage of juices from the pie.

A further object is to provide a pie pan lid having a handle which will enable the pie pan to be easily lifted to be inserted in and removed from an oven.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
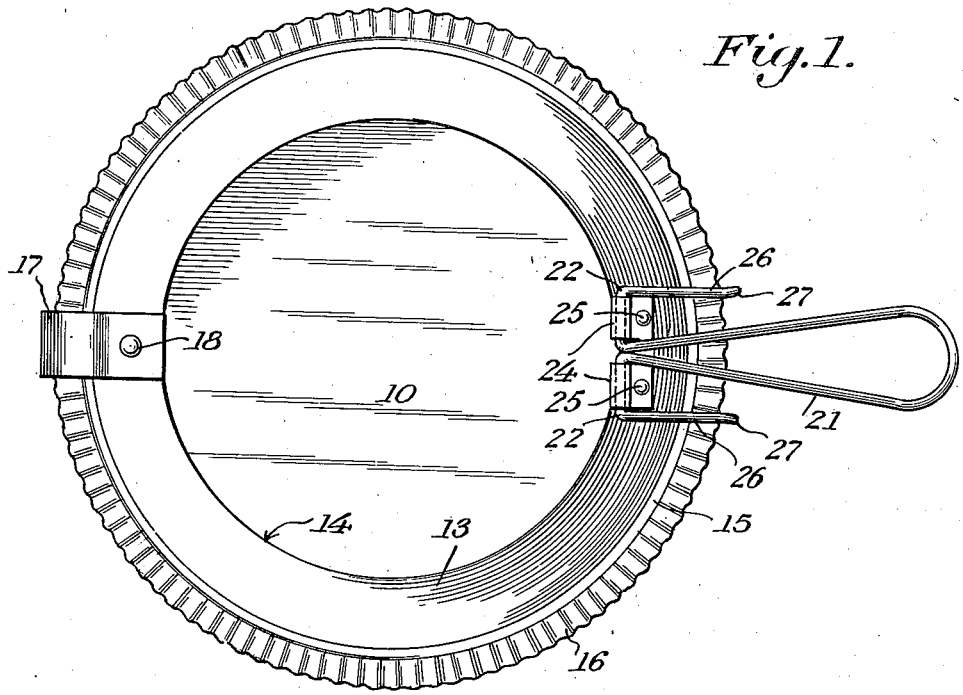
Figure 1 is a plan view of a pie pan lid constructed in accordance with the invention, in applied position.
Figure 2:
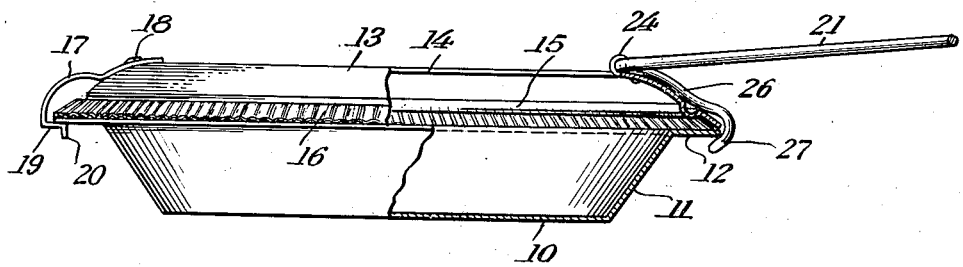
Figure 2 is a side elevation of the lid applied to a pie pan, partly broken away.

Referring now to the drawing in which like characters of reference designate similar parts in the various views, 10 designates a conventional pie pan having an inclined side wall 11 and a substantially horizontally disposed rim 12. The pie pan lid, in accordance with this invention, is an annulus 13 formed of sheet metal, having a relatively large central opening 14 and being dished upwardly at an angle of approximately 30° to the horizontal, as best shown in Figure 2. The annulus is provided with a circumferential struckout bead 15, which is concentric with the axis of the lid and is spaced upwardly from the bottom edge of the annulus a distance equal to approximately the thickness of the upper and lower crusts of a pie. When the annulus is applied to the pie pan with the bottom edge thereof engaging the rim 12 of the pie pan at the outer edge thereof, the bead 15 will press the two crusts of the pie firmly against the rim 12 of the pie pan and seal the crusts to the rim to prevent leakage of juices between them from the interior of the pie. The annulus is slightly curved above the bead and prevents leakage of juices from the pie over the annulus to muss up the oven. To further assist in the sealing function of the annulus, the annulus is provided with radial corrugations 16 below the bead.

A spring clip 17, formed from a single length of strap metal, is riveted as shown at 18, or otherwise secured to the annulus and is provided with an inturned free end 19, which hooks over the under surface of the pie pan rim 12. A finger 20 extends downwardly from the hooked end of the clip to permit the clip being easily grasped by the operator's fingers to be sprung over the pie pan rim 12 when applying or removing the lid from the pie pan.

For securing the lid to the pie pan diametrically opposite the spring clip 17, a single length of spring wire is bent to provide a loop handle 21, the ends of the wire being directed laterally, as shown at 22, to be received in strap metal eyes 24 which are riveted as shown at 25, or otherwise secured to the lid diametrically opposite the spring clip 17. The wire is bent rearwardly along the handle to provide spring clamps 26, which are bent at the outer ends to provide hooks 27 which are adapted to be sprung over the rim 12 of the pie pan by merely rocking the handle 21 from an upright position to a substantially horizontal position. Rocking the handle in the opposite direction disengages the clamp hooks 27 from the pie pan rim. The handle may be easily grasped to lift the pie pan with the lid clamped thereon and insert the same in an oven or remove the same from an oven.

From the above description it is thought that the construction and operation of the invention will be fully understood without further explanation.

What is claimed is:

1. A pie pan lid comprising a dished annulus adapted to rest with its lower edge upon the rim of a pie pan, an annular bead on the annulus spaced above the bottom edge of the annulus and adapted to press layers of pie crust firmly together against the rim of the pie pan and prevent leakage of juices from a pie, a spring clip secured to the annulus adapted to spring underneath the rim of the pie pan, and a handle pivotally connected to the annulus having integral spring hooks adapted to spring under the pie pan rim and coact with the spring clip in removably securing the lid to the pie pan.

2. The structure as of claim 1 and in which said annulus is corrugated below said bead to the bottom edge of the annulus, the corrugations coacting with the bead in sealing the pie crust layers against leakage of juices.

3. The structure as of claim 1 and in which said handle and spring hooks are formed from a single length of wire bent to provide a loop to form the handle thence bent laterally outwardly to provide pivot gudgeons and from the gudgeons being bent rearwardly along the handle to provide the spring hooks.

LINCOLN H. WINTERS.